United States Patent [19]

Higgins et al.

[11] 3,812,535

[45] May 21, 1974

[54] DISK RECORDER ARM ASSEMBLY

[75] Inventors: Ronald W. Higgins, San Jose; Donald J. Massaro, Sunnyvale, both of Calif.

[73] Assignee: Memorex Corporation, Santa Clara, Calif.

[22] Filed: Oct. 24, 1972

[21] Appl. No.: 300,274

[52] U.S. Cl. .......... 360/103

[51] Int. Cl. .......... G11b 5/60

[58] Field of Search .......... 179/100.2 P, 100.2 CA; 340/174.1 E, 174.1 F

[56] References Cited

UNITED STATES PATENTS

| | | | |
|---|---|---|---|
| 3,308,450 | 3/1967 | Bourdon et al. | 179/100.2 P |
| 3,055,987 | 9/1962 | Ricketts | 179/100.2 P |
| 3,349,384 | 10/1967 | Kohn | 179/100.2 P |
| 3,187,313 | 6/1965 | Smith, Jr. | 179/100.2 P |
| 3,579,213 | 3/1971 | Applequist | 179/100.2 P |

*Primary Examiner*—Vincent P. Canney

*Attorney, Agent, or Firm*—Limbach, Limbach & Sutton

[57] ABSTRACT

For use in disk recording device requiring retractably support arms for carrying recording transducers over the surface of a rotating magnetic recording disk, a support arm is formed of a thin sheet of stainless steel bent and wrapped into a box configuration for strength and torsional stiffness.

6 Claims, 8 Drawing Figures

DISK RECORDER ARM ASSEMBLY

BACKGROUND OF THE INVENTION

In magnetic disk recording devices there is commonly employed one or more high speed rotating disks on which one or more recording transducers are positioned to read or record information in a plurality of concentric tracks defined by predetermined positionings of a recording transducer relative to a disk. The arrangement of a rotating disk and independently supported transducer enables the disk to be randomly accessed for rapid information retrieval or transferal. One preferred method of supporting a recording transducer over a recording surface is by the use of an elongated cantilevered member which is attached to an accessing carriage arranged for reciprocal linear movement relative to the axis of the disk. The recording transducer is mounted to the distal or free end of the cantilevered member and is arranged to float or fly on air cushion created by the rapid rotation of the disk. To achieve a uniform flight over the disk and hence uniform recording characteristics, the transducer must have means to enable it to conform to physical imperfections in the surface of the disk. In this respect the transducer is retained in an aerodynamic shoe which is supported on the cantilevered structure by a gimbal or flexible mount.

Various methods of loading the transducer on the recording disk have been devised including torsion bars which deflect the cantilevered arms toward the disks and ramps on pre-biased arms which in cooperating with stationary cams permit the arms to be displaced toward the surface of the disks when the arms are moved toward the axis of the disks. It is with respect to this latter method of loading that the present invention is particularly related.

In cam-ramp type of loading it is desirable that the cantilevered structure be cammed along its longitudinal center-line in order that there is no twisting of the structure which would interfer with the descent of the transducer shoe onto the surface of the recording disk. However, other design considerations in construction of disk storage machines, such as minimizing the space between multiple disks arranged in stacks, dictate that the ramp design be arranged on the longitudinal edge of the cantilevered member. It is readily apparent that a spring loaded cantilevered member supported and loaded on its edge will be subjected to torsional stresses tending to twist or otherwise deform the member. To inhibit such deformation, it has been the practice to include ridges, troughs, and other corrugations in plate stampings employed as cantilevered members. Braces and crossmembers have also been used on such stampings for added stiffness.

To maximize the efficiency of a disk storage machine, the weight of the accessing mechanism including the cantilevered members must be minimized to reduce the inertial effects in the rapid stops and starts of normal operation. It is therefore a primary object of the present invention to provide an arm assembly which substantially improves the relative stiffness-weight relationship for a cantilevered member in a disk storage machine.

SUMMARY OF THE INVENTION

The present invention comprises a construction of a cantilevered member in an arm assembly for supporting a transducer in a disk storage machine. The cantilevered member utilizes a box construction formed from a single thin plate of stainless steel which is die stamped to a pattern blank, impact stamped to provide a loading ramp on its peripheral edge, creased to establish fold line and finally closed and spot welded along an overlapped edge. The creases provide preliminary angles of approximately 45° from which the finished fold can be obtained by wiping. In this manner, stainless steel, which is not customarily considered for intricate cold working, can be used for the cantilevered member. The properties of stainless steel enable the weight of the cantilevered member to be minimized and the strength and stiffness to be maximized. Furthermore, the cold worked stainless steel has a resilience which insures that any minimal deformation of the arm from side loading is temporary and is relieved once the imbalanced conditions are removed.

DETAILED DESCRIPTION OF THE PREFERRED EMBODIMENT

Figure 1:
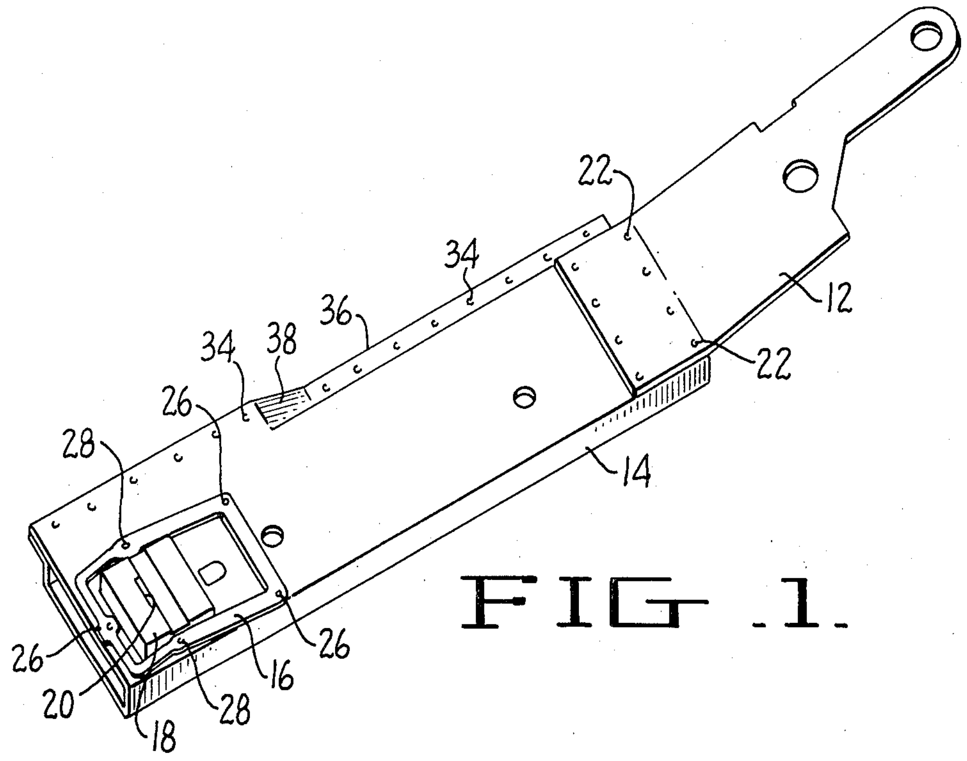
FIG. 1 is a perspective view of a transducer arm assembly.

Referring to FIG. 1, an arm assembly 10 is show in perspective and includes a load spring 12, a cantilevered member 14, a support flexure 16 and a transducer slider 18 in which a read-write transducer 20 is fixed. The load spring 12 of the arm assembly is connectable to a ridge mount (not shown), which is preferably of the type described in the application of Michael Kahn entitled, "Disk Recorder Arm Assembly Mount," filed on Oct. 24, 1972, bearing Ser. No. 300,276. The mount is supportable in a stacked array on an accessing carriage of a magnetic recording disk drive which forms no part of the present invention and is not here shown for conciseness of the present disclosure. The general type of disk drive and accessing mechanism for which the arm assembly is suitable is described in Applequist, U.S. Pat. No. 3,544,980 filed Mar. 22, 1968.

The load spring 12 is directly fastened to the surface of the cantilevered member 14 by spot welds 22. Adjacent the interface of the load spring 12 and cantilevered member 14, the spring is bent to provide a spring bias when spring and member are maintained substantially parallel during recording operations. In this manner the slider 18 is forced against a recording disk (not shown) with a predetermined loading force during operation.

Similarly, the support flexure is directly fastened to the surface of the cantilevered member by three spot welds 26. The preferred flexure is described in greater detail in the application of Herbert E. Thompson et al entitled, "Recording Head Flexure," filed Oct. 24, 1972, bearing Ser. No. 300,273. The remaining two spot welds 28 on the flexure fasten the slider 18 or transducer shoe to the flexure. Since the slider 18 may be of a ceramic material, two steel weld lugs 30, as shown in FIGS. 2 and 3, are provided on opposite sides of the slider during fabrication of the slider to facilitate fastening to the flexure.

Figure 2:
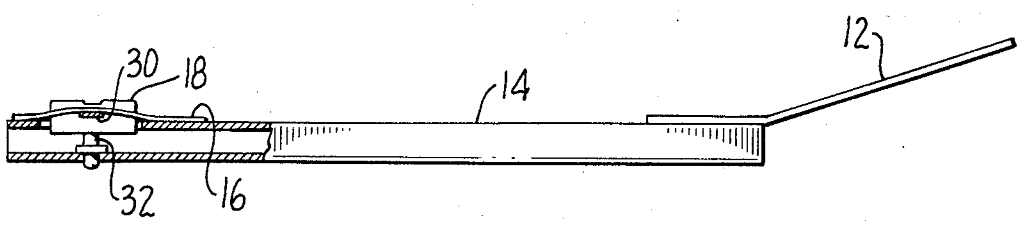
FIG. 2 is a side elevational view, partially in section, of the arm assembly of FIG. 1.
Figure 3:
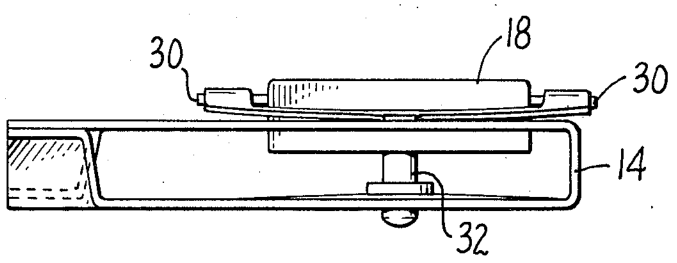
FIG. 3 is an enlarged end elevational view taken on the lines 3—3 in FIG. 2.
Figure 8:
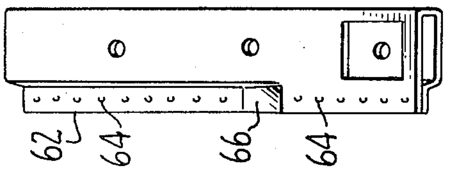
FIG. 8 is a schematic view of the metal blank of FIG. 7 wiped and welded.
Figure 7:
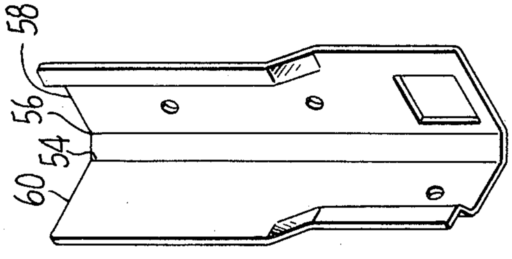
FIG. 7 is a schematic view of the metal blank of FIG. 6 sequentially bent.
Figure 6:
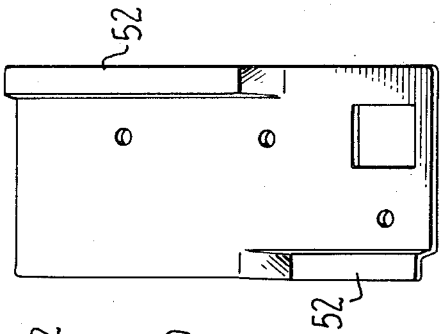
FIG. 6 is a schematic view of the metal blank of FIG. 5 die stamped.
Figure 5:
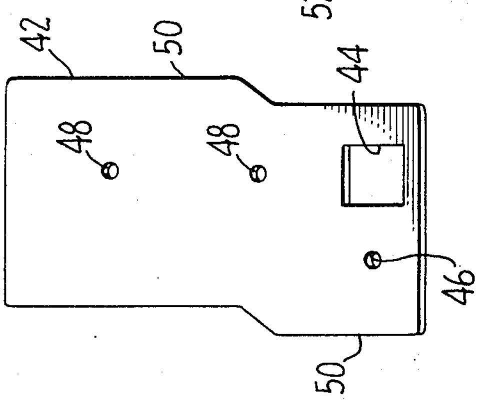
FIG. 5 is a schematic view of the metal blank of FIG. 4 die cut.

Referring to the elevational views of FIGS. 2 and 3, the tubular or box construction of the cantilevered member in the arm assembly is more apparent. The box construction permits a load button 32 to be anchored in a hole within the cantilevered member. The load button 32 is arranged to be located at the geometric center of the back of the slider. In this manner the force of the spring bias during operation is transmitted to the center of the slider. Any roll or pitch in the slider caused by surface imperfection in a recording disk during operation are absorbed by the flexure. By permitting the slider to be seated partially within the tubular construction of the cantilevered member, a low overall profile of the arm assembly can be maintained.

The cantilevered member shown in FIG. 1 is formed from a single plate which is overlapped and secured with spot welds 34 along one edge 36. Since the preferred embodiment is usable with a cam-ramp type loading mechanism as described in the referenced patent, a ramp 38 is incorporated in the welded edge 36 as shown. The necessary height of the ramp is therefore a determining factor in the thickness of the box construction of the arm assembly.

Figure 4:
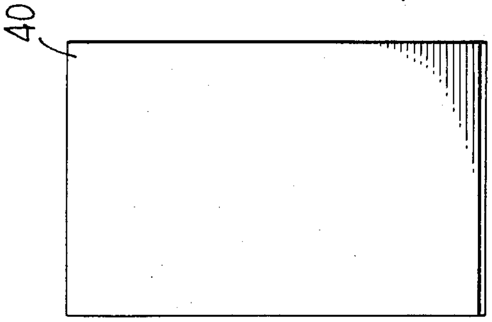
FIG. 4 is a schematic view of an uncut metal blank.

The manner of forming the box construction of the cantilevered member is schematically shown in FIG. 4 (*a–e*). In FIG. 4(*a*) a rectangular sheet 40 of nonmagnetic No. 316 stainless steel, 8 mils thick, is die cut to the general configuration shown in FIG. 4(*b*). The die cut blank 42 has a rectangular aperture 44 provided for location of a transducer slider. Additionally, a small hole 46 is provided for the anchoring of a load button. The other holes 48 in the blank are tooling holes used in the assembly of the arm components. Extensions 50 on each side of the blank 42 are provided to accomodate the ramp formed along one longitudinal edge of the finished cantilevered member. To form the ramp the blank is struck with an impact die which cold works the two extensions 50 to form the two matched elevation steps 52 shown in FIG. 4(*c*). To fold and form the box construction the worked blank is sequentially bent along two longitudinal crease lines 54 and 56 with conventional sheet metal working equipment. The corner bends each form approximately a 45° angle with the original plane of the blank. The bends are short of the 90° bends necessary to complete the enclosure only as a matter of expedience to permit the bends to be formed on conventional equipment. Alternate methods of forming the corner bends are available such as the use of an impact wedge and grooved die where both bends are formed simultaneously. It has, however, been found that the 45° bends are sufficient to allow the leaves 58 and 60 of the blank to be folded over to obtain the box construction shown in FIG. 4(*e*). The folding of the blank can be simply accomplished by securing one leaf 58 of the blank and wiping across the other leaf with a clamping tool which clamps the two leaves together at their common edge 62. The longitudinal edges can then be secured by a plurality of spot welds 64. The edge elevations are matched to provide a continuous interface with the remaining blank along the common lap 62 particularly at the ramp section 66. In this manner a strong box construction is obtained with an integral ramp section along one finished edge by a simple and inexpensive method. The particular cantilevered member of the preferred embodiment has dimensions of 700 mil width, 8 mils thickness and 3 inches in length. These dimensions are, of course, variable according to the particular device in which the arm assemblies are incorporated. Furthermore, in devices where an alternate means from the cam-ramp method of loading a transducer slider on a disk are employed, the incorporation of a ramp in the construction of the cantilevered member can be dispensed with and the construction of the arm simplified. In this respect an elevated portion can be stamped continuously along one edge of a blank and the stamping of the other edge eliminated. The blank is folded and secured in the same manner.

We claim:

1. In an arm assembly comprising a cantilevered member, means for mounting the cantilevered member to an accessing mechanism is a disk recording machine, and a recording transducer fixed in a slider, wherein said cantilevered member has a cantilevered length from a first end connected to said mounting means to a second distal end operably connected to said recording transducer; an improved cantilevered member comprising:

a metal plate blank having two opposite longitudinal edges, at least one edge having a continuous elevated step, the blank having further two adjacent longitudinal folds forming an overlap of the two longitudinal edges, said edges being secured together, wherein said cantileverd member formed from said blank has a folded edge and a lapped edge along the cantilevered length of the member, said member being tubular with a cross section transverse to the cantilevered length of substantially box configuration.

2. The improved cantilevered member of claim 1 having further means for mounting said cantilevered member to an accessing mechanism, wherein said means comprises in part a leaf spring member attached to a first end of said cantilevered member.

3. In an arm assembly comprising a cantilevered member, means for mounting the cantilevered member to an accessing mechanism in a disk recording machine, and a recording transducer fixed in a slider, wherein said cantilevered member has a cantilevered length from a first end connected to said mounting means to a second distal end operably connected to said recording transducer; an improved cantilevered member comprising a stainless steel sheet blank having two opposite longitudinal edges, one edge having a first elevated step portion with a ramp section and the other edge having a second elevated step portion with a ramp section, said second step portion being diametrically opposite said first step portion, said blank having further two adjacent folds forming an overlap of the two longitudinal edges, said two step portions and ramp sections being matched to form a continuous overlap with a common ramp, said edges being secured together, wherein said cantilevered member formed from said blank has a folded edge and an overlapped edge along the cantilevered length of the member, said member being tubular with a cross section transverse to the cantilevered length of substantially box configuration.

4. The improved cantilevered member of claim 3 having further means for mounting said cantilevered member to an accessing mechanism, wherein said means comprises in part a leaf spring member attached to a first end of said cantilevered member.

5. The improved cantilevered member of claim 1 wherein said metal plate comprises a thin stainless steel sheet.

6. The improved cantilevered member of claim 1 wherein said edges of said elongated structure are secured by spot welds.

* * * * *